Sept. 26, 1967     W. R. DUNN     3,343,557

MANIFOLD VALVE

Filed April 26, 1963     2 Sheets-Sheet 1

INVENTOR.
WILLIAM R. DUNN
BY
Alan M. Staubly
ATTORNEY

Sept. 26, 1967 W. R. DUNN 3,343,557
MANIFOLD VALVE

Filed April 26, 1963 2 Sheets-Sheet 2

INVENTOR.
WILLIAM R. DUNN
BY
*Alan M. Staubly*
ATTORNEY

United States Patent Office 3,343,557
Patented Sept. 26, 1967

3,343,557
MANIFOLD VALVE
William R. Dunn, Los Angeles, Calif., assignor to
Honeywell Inc., a corporation of Delaware
Filed Apr. 26, 1963, Ser. No. 275,839
6 Claims. (Cl. 137—66)

This invention is concerned with the design of a manifold valve for use in gas burner installations. More specifically, the invention is directed to a control device which incorporates a safety pilot valve, a pressure regulator valve, and a control valve in a single compact unit.

While valves of this general nature are well known in the heating controls art, the fact that burner units are getting smaller and smaller, requiring that the controls for the burner also become smaller, the demand for very compact controls for the gas burner becomes increasingly great as the years go by.

One of the objects of this invention is to provide a very compact manifold valve wherein a valve body is of such a construction that it may be used to embody a safety pilot valve, a pressure regulator valve, and a control valve only or may, by a slight modification of the valve body, incorporate the above-mentioned valves plus a manually operated valve.

Another object of the invention is to provide a manifold valve of the first-mentioned type wherein the pressure regulator valve is adapted to serve as an interrupter valve for the safe resetting of the safety valve.

A further object of the invention is to decrease the over-all height of the valve of the above-mentioned type by having the pressure regulator valve located within the manually operated valve or the cavity adapted to receive the manually operated valve and by substituting a tension spring located within the main valve body for biasing the pressure regulator valve toward its open position.

Still further objects of the invention will become apparent upon reading the following detailed description thereof in conjunction with the accompanying drawing, wherein.

Figure 2:
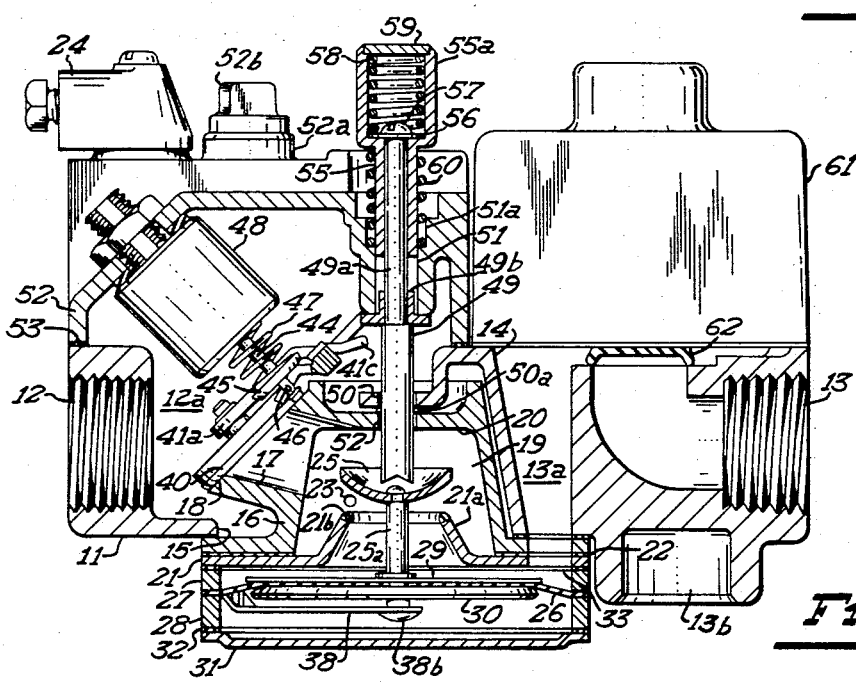
FIGURE 2 is a vertical sectional view through the valve body, the safety pilot valve, and the pressure regulator valve.
Figure 3:
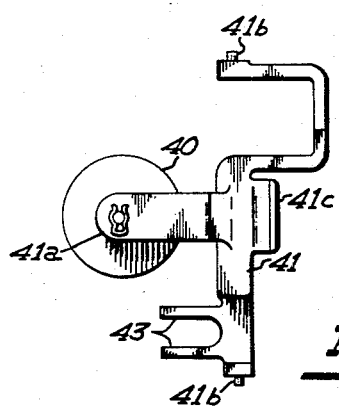
FIGURE 3 is a plan view of the safety valve and its pivoting means.

Referring to FIGURE 2 of the drawing, the reference numeral 11 designates the main valve body having a threaded inlet 12, a threaded outlet 13 and a partition wall 14 therebetween. Alternate outlet cavities 13b are formed in the valve body to save metal and to make it possible with only a small amount of machining to provide an outlet at a right angle to the inlet 12, if so desired. Positioned over the opening 15 in the bottom of the valve body 11 is a pressure regulator valve body 16 that projects into the inlet chamber 12a with one wall thereof closely adjacent to the partition wall 14 and with another portion thereof substantially in axial alignment with the inlet 12. A passageway 17 extends through the side wall of the body 16 in line with the inlet 12, that is from a valve seat portion 18 to an inlet chamber 19 of the pressure regulator valve. This inlet chamber is of frusto-conical shape, open at its bottom and having an apertured wall 20 at the upper end thereof. A partition plate 21 extends across the under side of the regulator body 16, with a sealing gasket 22 therebetween, and has a frusto-conical portion extending upwardly and inwardly into chamber 19. An annular rubber valve seat tip 21b is suitably secured to the annular upper end of the portion 21a to form a valve seat. A pilot gas passageway 23 extends from the inner surface of the chamber 19 through connecting passageways (not shown) to the pilot burner outlet unit or coupling 24.

Figure 1:
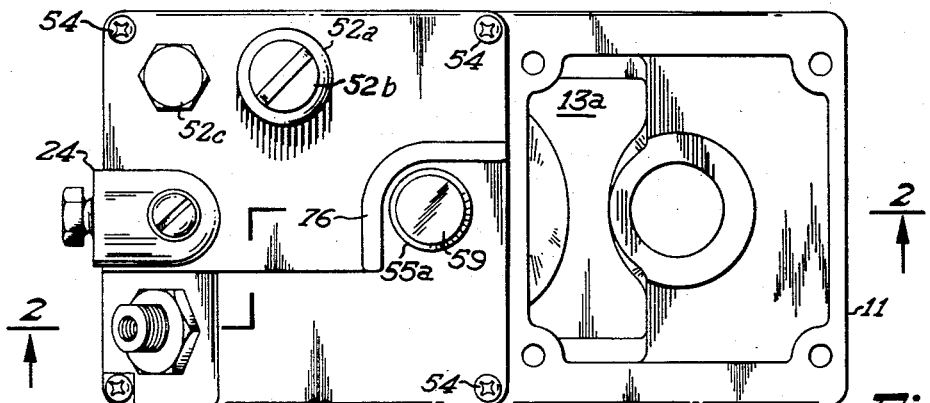
FIGURE 1 is a plan view of the invention with the automatic control valve removed therefrom.
Figure 4:
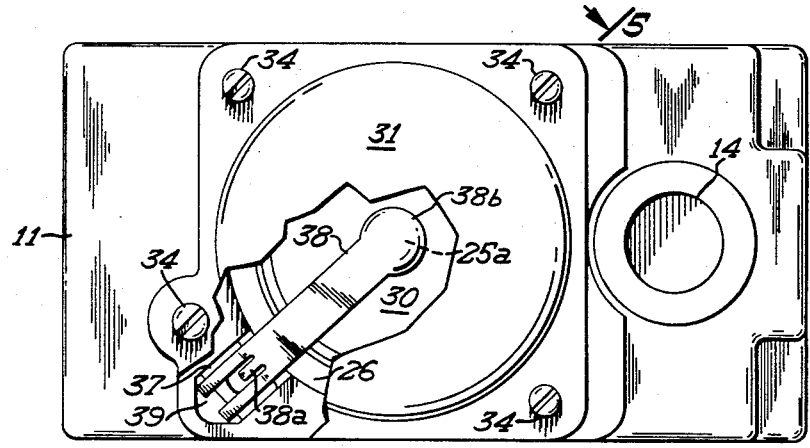
FIGURE 4 is a bottom view of the invention with a portion thereof broken away.
Figure 5:
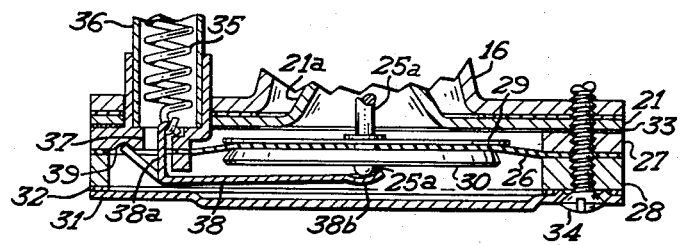
FIGURE 5 is a fragmentary cross-sectional view of the pressure regulator taken along lines 5—5 of FIGURE 4.

A pressure regulator valve 25 is positioned above the valve seat 22 and has a stem portion 25a that extends through the valve seat to a diaphragm 26 clamped between two spacer rings 27 and 28. The diaphragm is also clamped between two backing plates 29 and 30 secured to the lower end of the valve stem 25a. A cover plate 31 is secured over the spacer ring 28 with a sealing gasket 32 therebetween. A sealing gasket 33 is also positioned between the spacer ring 27 and the partition plate 21. All of the parts of the pressure regulator valve as well as the regulator valve are secured to one another and the valve body 11 by means of bolts 34 (shown in FIGURE 4 of the drawing). The pressure regulator valve 25 is normally biased to its wide open position by means of a coiled tension spring 35 located in a tube 36. The tube extends from an aperture 37 through the clamping ring 27 and aligned apertures in the partition plate 21 and the body portion 16 (see FIGURE 5) to the top of the valve cover at 52a (see FIGURE 1), where it is closed by a plug 52b. A vent plug 52c is connected by suitable passages (not shown) to the interior of the tube 36 and thus to the chamber under the diaphragm. The lower end of the spring 35 is connected to an upwardly extending arm 38a of a pivoted lever 38. One end of the lever 38 is pivoted in a notch 39 formed in the lower surface of the clamping ring 27 while the other end of the lever 38 has a downwardly dished portion 38b that receives and bears against the rounded lower end of the valve stem 25a. The upper end of the spring 35 is connected to an adjusting means (not shown) in the upper end of the tubular portion 36.

Figure 6:
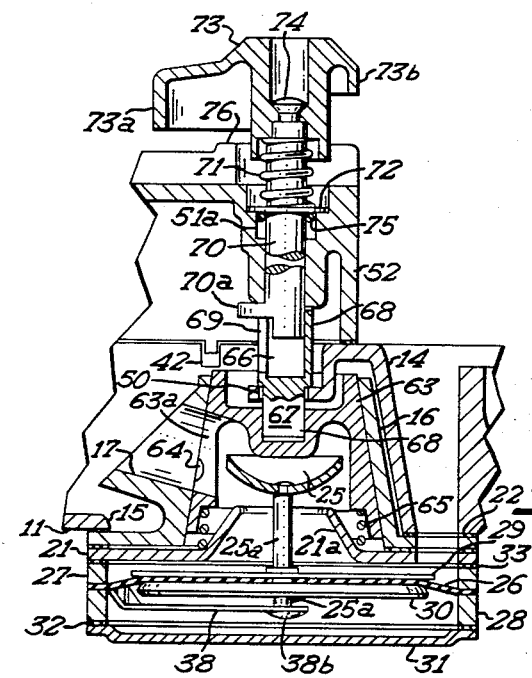
FIGURE 6 is a fragmentary view in cross section of a modification of the invention.

A safety valve 40 is connected to the outer end of an arm 41a of a pivot member 41 which is rockably mounted on pins 41b in grooves 42 formed in the upper edges of the valve body 11 (see FIGURE 6). A pair of fingers 43 extend from the pivot member 41 and straddle an armature stem 44 between an abutment shoulder 45 and a retainer-abutment spring 46. A coil compression spring 47 is positioned between the abutment member 45 and the housing of a conventional thermocouple energizable electromagnet unit 48. The valve 41a is adapted to be moved to its open position against the bias of spring 47 by rocking the pivot member 41 clockwise (as viewed in FIGURE 2) on the pivot pins 41b by actuation of the transversely extending actuating arm 41c located intermediate the ends of the pivot member 41.

The means for actuating the arm 41c includes a last-motion mechanism which may take either the form shown in FIGURE 2 of the drawing or the form shown in FIGURE 6 of the drawing. In FIGURE 2, a manually operable reset plunger 49 extends through an aperture 50 in the partition wall 14, through an O-ring seal 50a and through an aperture 52 in the wall 20 of the pressure regulator valve body 16. The lower end of this reset plunger 49 is formed to engage the upper end of the valve stem 25a of the pressure regulator valve 25 to move the regulator valve to its closed position when the plunger is depressed. Slidably mounted on the reduced diameter portion 49a of the reset stem and bearing against the shoulder formed at the lower end thereof, is a flanged collar 49b. The flange is of such diameter that it will engage the outer end of the arm 41c when the reset stem is depressed. The sleeve portion of the member 49b extends into the lower end of a stepped bore 51 formed in a cover 52 which, in turn, is clamped to the upper surface of the valve body 11 with a sealing gasket 53 therebetween, by means of bolts 54. A cylindrical sleeve extension 55 of the reset stem 49 is slidably mounted on the upper reduced diameter portion 49a and has an enlarged inner and outer diameter finger engaging head 55a that is located above the upper surface of the cover 52. An abutment washer 56 is secured to the upper end of the portion 49a and within the head portion 55a by means of a bolt 57 screw-threaded into the upper end of the portion 49a of the reset stem. A compression spring 58 extends between the washer 56 and a welch plug 59 secured in the upper end of the portion 55a. Another coil compression spring 60 surrounds the lower portion of the extension 55 and extends between the head portion 55a and the bottom of an enlarged diameter portion 51a of the stepped bore 51. The relative strengths of the springs 47, 58, 60 and 35 are such that when the head portion 55a is manually depressed, the flanged sleeve 49b will be lowered into engagement with the arm 41c and thereafter slide on the stem portion 49a while the stem portion continues on downward against the bias of spring 60 to engage the valve 25 and move it against the bias of spring 35 to close the valve 25 against its seat 21b. Thereafter, upon further movement of the head portion, the spring 58 will be compressed permitting the lower end of the sleeve extension 55 to engage the upper end of the sleeve 49b and to compress the spring 47 to reset the armature (not shown) against the electromagnet (not shown) in the unit 48, thus opening the valve 41a.

While a conventional thermostatically operable valve 61, having a valve head 62 thereon, is illustrated as being secured to the valve body 11 over the outlet chamber 13a, it is to be understood that a cover plate (not shown) could be substituted for the valve 61 which would, in effect, provide unobstructed gas flow from the chamber 13a to the outlet 13.

A modification of the above invention, illustrated in FIGURE 6 of the drawing, may make use of the valve body disclosed in FIGURES 1–5 of the drawing by merely cutting away the partition wall 20 shown in FIGURE 2 of the drawing and inserting a rotary plug valve 63. This plug valve has an arcuate groove 64 formed in the periphery thereof to establish communication between the passageway 17 and the pilot gas passageway 23 (see FIGURE 2), when the valve is in either its "on" or "pilot" position. This modification also does not require that the reset stem pass through the valve 63 and therefore needs no O-ring seal as in the first-mentioned modification of the invention. A coil compression spring 65 normally biases the plug valve 63 into engagement with the frusto-conical recess in the valve body 16 while a valve stem 66 has a non-round portion 67 extending into a non-round socket 68 formed in the upper end of the plug valve and extends rotatably through the aperture 50 where it joins with an enlarged diameter sleeve portion 68.

The portion 68 has a slot 69 in the side thereof which receives a projecting arm 70a of a reset stem 70, which is slidable in the sleeve portion 68. A coil compression spring 71 extends between an abutment washer 72 resting on a shoulder provided at the upper end of the bore portion 51a and a reset knob 73 fastened to the upper end of the stem 70 by means of a bolt 74. An O-ring seal 75 surrounds the stem 70 and bears against the wall of the recess 51a. A skirt portion 73a of the reset knob 73 is adapted to bear against or engage a raised rib 76 formed on the top of the cover 52 so that the reset stem arm 70a cannot be lowered to try to engage the arm 41c to open the valve 41a when the plug valve is in its "on" position. The knob also has a skirt portion 73b which is much shorter than the skirt portion 73a which is adapted to be positioned over the rib 76 when the plug valve is in its "pilot" position, a position wherein a main gas flow aperture 63a is out of register with the passageway 17. With the portion 73b being over the pad 76 and the portion 73a being over the area between the ends of the pad 76, the reset stem 70 may be depressed a sufficient distance to cause the arm 70a to engage the arm 41c and pivot the valve 41a to its open position. In this position, gas can flow from the inlet 12, past the valve 41a, through the arcuate groove 64 in the plug valve to the pilot outlet 23, through passageways in the valve body, and through the outlet connector 24 to a pilot burner (not shown).

OPERATION

The invention is shown in its closed condition. That is, the safety valve is closed. With the invention installed in a heating system, in a conventional manner, the system may be placed into operation by depressing the knob 55a to prevent main gas flow past the pressure regulator valve 25 while opening the safety valve 40. With 40 open, gas can flow from the inlet 12 past the valve 41a through passageway 17 to the pilot gas outlet 23. If the pilot burner to which the outlet 24 is connected is then ignited, the magnet of the unit 48 will become energized and will hold the safety valve open. Releasing of the knob 55a will then permit the spring 60 to open the regulator valve 25 under the bias of spring 35 by forcing the reset plunger 49 away from the valve 25. Gas will then flow to the main burner past the pressure regulator valve, over the diaphragm 26 and past the control valve 62, provided it is calling for heat, to the outlet 13 and to a main burner of the installation. Upon flame failure, the safety valve will close, due to the deenergization of the magnet of unit 48.

Safe lighting of the modification of FIGURE 6 is also provided in that the reset knob 73 can only be depressed in the "pilot" position cut off the main gas flow while permitting pilot gas to flow past the safety valve to the arcuate groove 64, pilot passageway 23 and the pilot outlet 24 connected to the pilot burner. Once the pilot burner has been ignited, to cause the safety valve to be held in its "open" position, the plug valve may then be rotated to its "on" position to permit main gas flow to flow past the pressure regulator valve and the control valve to the outlet and the main burner.

As it is deemed that modifications may be made in the present invention without departing from the spirit thereof, the scope of the invention should be determined from the appended claims.

I claim:

1. A manifold valve comprising a valve body having an inlet chamber with an inlet passageway and an outlet chamber with an outlet passageway and a partition wall therebetween, said chambers having openings at their top and bottom surfaces; an apertured cover for said inlet chamber; a safety valve in the inlet chamber; a pressure regulator valve housing secured to the bottom of said valve body and covering the openings in the bottom surface of the body, said housing having an inlet chamber projecting into the inlet chamber of said valve body with an inlet formed therein to provide a valve seat for said safety valve to engage and with an opening in the top thereof and an opening in the bottom thereof; a valve seat partition plate covering said last-mentioned opening and having an annular valve seat portion projecting into the inlet chamber of said housing in series flow communication with the first mentioned valve seat; a diaphragm positioned below and clamped at its periphery to the periphery of said plate so as to form a pressure chamber therebetween; a pressure regulator valve positioned in the inlet chamber of said housing and having a stem extending through said plate and connected to said diaphragm so as to cooperate with the valve seat of said plate to provide pressure regulation; means biasing said pressure regulator valve to its open position; a manually operable reset plunger mounted in the aperture of said cover and extending through said opening in the top of said housing; said plunger being movable inwardly to engage and close said pressure regulator valve; means on said reset plunger so arranged as to engage and open said safety valve after said pressure regulator valve is closed and upon continued movement of said reset plunger; a passageway leading from said pressure chamber through said plate and through said housing to said outlet chamber; and a control valve unit positioned in said outlet chamber and closing the opening thereof in the top surface of the outlet chamber of said valve body and having a valve positioned to control flow through said outlet passageway.

2. A manifold valve as defined in claim 1 wherein lost-motion means is associated with said reset plunger as to enable relative movement between said safety valve engaging means on said reset plunger and the pressure regulator valve engaging portion of said plunger.

3. A manifold valve as defined in claim 2 wherein said reset plunger comprises two telescopic parts spring biased in a lengthening direction.

4. A manifold valve comprising a valve body having an inlet, an outlet, a flow passage therebetween, and first and second valve seats in said flow passage; a safety valve cooperable with said first valve seat and normally biased to a closed position; condition responsive means capable of holding said first valve open but incapable of opening it; a pressure regulator valve cooperable with said second valve seat and normally biased to its open position; pressure responsive means for actuating said pressure regulator valve; and manually operable means having a lost-motion mechanism arranged to first close said pressure regulator valve and then to open said safety valve, in placing said manifold valve in operating condition.

5. A manifold valve as defined in claim 4 wherein the first and second valve seats and the pressure regulator valve are parts of a subassembly.

6. The combination defined in claim 4 wherein the space between said first and second seats is partially shaped to receive a plug-type of valve therein and a wall of said space is readily removed to complete the space required to receive the plug valve.

References Cited

UNITED STATES PATENTS

| | | | |
|---|---|---|---|
| 309,260 | 12/1884 | Taylor | 137—505.41 X |
| 1,231,293 | 6/1917 | Peters | 137—505.41 |
| 1,897,517 | 2/1933 | Hughes | 137—495 |
| 2,515,252 | 7/1950 | Niederer et al. | 137—495 |
| 2,834,373 | 5/1958 | Schwarz et al. | 137—505.41 X |
| 3,170,485 | 2/1965 | Ages | 137—66 X |

FOREIGN PATENTS

| | | |
|---|---|---|
| 522,579 | 6/1940 | Great Britain. |

WILLIAM F. O'DEA, *Primary Examiner.*

ISADORE WEIL, *Examiner.*

R. GERARD, *Assistant Examiner.*